United States Patent [19]

Niebyski et al.

[11] 3,816,952

[45] June 18, 1974

[54] PREPARATION OF METAL FOAMS WITH VISCOSITY INCREASING GASES

[75] Inventors: Leonard M. Niebyski, Birmingham; Chester P. Jarema, Detroit, both of Mich.; Thomas E. Lee, Baton Rouge, La.

[73] Assignee: Ethyl Corporation, Richmond, Va.

[22] Filed: Mar. 10, 1971

[21] Appl. No.: 123,099

Related U.S. Application Data

[63] Continuation-in-part of Ser. No. 63,666, Aug. 13, 1970, abandoned, which is a continuation-in-part of Ser. Nos. 800,724, Feb. 19, 1969, abandoned, and Ser. No. 800,745, Feb. 19, 1969, abandoned.

[52] U.S. Cl.................................... 75/20 F, 75/138
[51] Int. Cl...................................................... C21b
[58] Field of Search ............................. 75/20 F, 138

[56] References Cited
UNITED STATES PATENTS

| | | | |
|---|---|---|---|
| 3,214,265 | 10/1965 | Fiedler | 75/20 F |
| 3,300,296 | 1/1967 | Hardy et al | 75/20 F |
| 3,379,517 | 4/1968 | Graper | 75/20 F |

*Primary Examiner*—Walter R. Satterfield
*Attorney, Agent, or Firm*—Donald L. Johnson; Robert A. Linn

[57] ABSTRACT

Materials such as air, oxygen, nitrogen, argon, $CO_2$, and water increase the viscosity of molten aluminum base metals. Molten metals so treated yield superior metal foams when blown with a blowing agent. Typical blowing agents which can be used are zirconium, hafnium, and titanium hydrides. Non-stoichiometric materials, $MH_a$ wherein M is titanium, hafnium or zirconium, and a has the value of about 1.65–1.80 can be used as blowing agents. Such non-stoichiometric materials are made by heating the (substantially) stoichiometric compounds.

42 Claims, No Drawings

PREPARATION OF METAL FOAMS WITH VISCOSITY INCREASING GASES

REFERENCE TO RELATED APPLICATIONS

This application is a continuation-in-part of pending application Ser. No. 63,666, filed Aug. 13, 1970, and now abandoned, which in turn is a continuation-in-part of application Ser. No. 800,724 and application Ser. No. 800,745, both filed Feb. 19, 1969, and both now abandoned.

BACKGROUND OF THE INVENTION

Foamed metals have been described; see, for example, U.S. Pat. Nos. 2,895,819; 3,300,296; and 3,297,431. In general, such foams are produced by adding a gas-evolving compound to a molten metal and heating the mixture to decompose the compound to prepare blowing gas. The gas expands causing the metal to foam. After foaming, the resultant body is cooled to form a foamed solid. The gas foaming solid can be a metal hydride such as $TiH_2$, $ZrH_2$, or lithium hydride, U.S. Pat. No. 2,983,597.

Many prior art foams have cells of non-uniform structure or undesirable large size. A main reason for this is the inability to evolve blowing gas and disperse it throughout the mass to be foamed at optimum rates. Thus, a need exists for a method of increasing the viscosity of the molten metal to aid in the blowing step. This invention satisfies that need.

SUMMARY OF THE INVENTION

Accordingly, this invention pertains to a method for increasing the viscosity of molten metals and the viscous melts produced thereby. Metals of particular interest are aluminum and its alloys. Thus, this invention provides a process for increasing the viscosity of a molten aluminum base metal which comprises adding to said metal a viscosity-increasing amount of a viscosity-treating agent. Preferably, the aluminum base metal is an aluminum alloy; however, aluminum itself can be employed in this invention. Of the alloys, those in which a major portion is aluminum are preferred. Moreover, it is preferred that the aluminum be alloyed with a metal selected from magnesium, titanium, copper, zinc, manganese, tin, and silicon.

The viscous nature of the melts produced by this process suggest use wherever it is desired to diminish flow characteristics of molten metals; for example, where it would be advantageous to restrict the flow of molten metals through conduits in metallurgical processing. Moreover, an important utility of these melts is their surprisingly advantageous use in preparation of superior quality metal foams.

An aspect of this invention comprises the improved step of foaming a molten metal containing a viscosity-increasing amount of a viscosity-increasing agent. Moreover, important aspects of this invention comprise foaming a melt made more viscous by a gas or vapor; for example, carbon dioxide or steam respectively. As illustrated below, viscosity-increasing agents introduced into a molten metal mass in the practice of this invention, achieve thickening without introduction of a solid substance derived from a non-volatile component of the thickening agent. For thickening by this invention, a decomposition reaction to produce a volatile component is not required.

Accordingly, this invention provides a method for producing an aluminum base foam which comprises (a) increasing the viscosity of a molten aluminum base metal with a viscosity-increasing amount of a viscosity-increasing agent, and (b) treating the viscous melt thereby produced. In this operation, the thickened system is heated sufficiently to thermally decompose the blowing agent to release gas which makes the foaming take place.

Upon cooling, a solid foam is produced. Such foams produced by this invention are characterized by a surprising degree of uniformity in pore size and configuration. They can be used as structural materials especially where it is advantageous to have a light metal construction; for example, in trailer walls, doors and floors, aircraft decking, sandwich wall constructions, curtain walls, etc.

Ordinarily molten aluminum and its alloys have viscosities akin to water. When such metals are treated with a viscosity-increasing agent in accordance with this invention a much thicker melt can be produced. Generally speaking, the thickness is proportional to the amount of agent added. In fact, it is possible to make a material so thick that it is stirred with difficulty by powerful stirring devices.

Viscosity, as the term is used herein, refers to fluidity of a liquid. (In a technical sense, fluidity is the reciprocal of viscosity or "apparent" viscosity.) A liquid will flow slowly (have less fluidity) when the viscosity is increased. There are two types of viscosity, true viscosity and apparent viscosity. Apparent viscosity refers to the viscosity equivalence in appearance and mobility of a fluid which when measured with a viscometer evidences no or only a slight change in true viscosity. An example of a material exhibiting apparent viscosity is whipped cream. It is not known whether the viscosity increasing treatment of this invention results in an increase of true and/or apparent viscosity. Nevertheless, the above viscosity increasing agents, for example, can change an aluminum base metal from a material having about the same resistance to flow as water, to one much less fluid. It appears that the increase in viscosity is a major increase in apparent viscosity and a minor increase in true viscosity. It has been found that treatment of an aluminum alloy having 7 per cent magnesium with a viscosity increasing agent increased the viscosity (according to viscosity measurement) only about 16 centipoises. Nevertheless, when such a molten alloy is treated, according to this invention it is possible to prepare a viscous melt very resistant to pouring out of a spoon even when the spoon is turned over.

In foams produced by the process of this invention, pore size is smaller and more uniform. Moreover, the use of a viscosity increasing agent makes it possible to use less foaming agent than would otherwise be required, the reduction in amount of foaming agent being greater than that provided by any expansion of the alloy due to the presence of the viscosity increasing agent. For example, when carbon dioxide is used and $ZrH_2$ is the foaming agent, 0.6 gram of $ZrH_2$ will give the same expansion that 1.0 gram thereof provide in the absence of $CO_2$ pretreatment. This provides a considerable saving in the cost of foaming.

One can calculate how much gas is required to achieve a desired amount of foaming. The amount of gas is conveniently expressed in theories and one theory is the amount of gas which would be generated (if the foaming agent completely decomposed) to produce a known void volume in a mass (conveniently expressed in pounds per cubic foot density or g/cc of foam). For 15 pounds per cubic foot density, 2.5 to 3.0 theories of $TiH_2$ are required and this is equivalent to 0.8 to 1.0 gram $TiH_2$ per 1,000 grams of metal. However, after $CO_2$ treatment, to make an equivalent foam, only 1.2 to 1.7 theories or 0.4 to 0.6 gram of $TiH_2$ are required.

DESCRIPTION OF PREFERRED EMBODIMENTS

In the main, this invention pertains to the discovery that certain agents increase the viscosity of molten aluminum base metals. Another important discovery to which this invention pertains is that viscous aluminum base metals yield superior metal foams. We have also discovered that non-stoichiometric metal hydrides can be advantageously used as blowing agents. Other discoveries will be apparent from the description of this invention which follows.

There is a number of important aspects of this invention. Among these, the following are illustrative.

1. Process for increasing the viscosity of molten aluminum base metals, and the viscous melts produced thereby;
2. Process for preparation of improved metal foams comprising blowing viscous molten aluminum melts, and the foams produced by this process; and
3. Use of non-stoichiometric metal hydrides as blowing agents, and foams produced by use of these agents.

With regard to metals, this invention is primarily directed to aluminum and its alloys. Commercially available aluminum can be used. Typically, such aluminum is 98.5 to 99.9 per cent pure. The common impurities are silicon, tin, and magnesium, and the amount of such impurities is from 1.5 to 0.01 weight per cent. Commercially available aluminum metal preparations include aluminum Alloy-3S (98 per cent Al, 1.25 per cent Mg), Alclad 17–ST (99.7 + per cent aluminum), and Aluminum 2S (99.2 per cent aluminum). Preferred aluminum alloys which can be used contain a major amount of aluminum. More preferably, such alloys contain at least 65 per cent aluminum. Thus, besides aluminum, other applicable aluminum based materials contain up to 35 per cent of one or more alloying elements. More preferably, such alloys contain, besides aluminum, a second metal selected from magnesium, titanium, copper, zinc, manganese, tin and silicon. With regard to these alloying elements, the following table indicates the preferred and most preferred concentrations ranges:

TABLE 1

| Metal | Preferred | Most Preferred |
| --- | --- | --- |
| Magnesium | 2–10 per cent | 4–8 per cent |
| Titanium | 0.5–2.5 per cent | 0.8–1.2 per cent |
| Copper | 2.5–35 per cent | 8–12 per cent |
| Zinc | >3–15 per cent | 8–12 per cent |
| Manganese | 0.4–1.5 per cent | 0.4–0.8 per cent |
| Tin | 0.4–2 per cent | 1–2 per cent |
| Silicon | 0.4–12 per cent | 0.4–2 per cent |

For the purposes of this invention, "substantially pure aluminum" refers to aluminum having a purity of at least 98.5 (weight) per cent, and "aluminum base metal" refers to such aluminum and aluminum alloys wherein the aluminum content is at least about 65 (weight) per cent.

With regard to viscosity-increasing agents, air, oxygen, introgen, carbon dioxide, argon and water can be used. All of these are in the gaseous state at the temperatures of the molten metals employed. However, the physical state of the viscosity-increasing agent is not critical. Thus, for example, $CO_2$ may be incorporated by adding it to the molten metal either in the solid or liquid state; water may be employed as liquid water, ice, or steam; and nitrogen may be used as a gas or as the cryogenic liquid. For the purposes of this invention, the term "gaseous viscosity increasing agent" can be used to describe the thickening agents provided by the invention.

FURTHER CONSIDERATIONS PERTAINING TO THICKENING

To achieve thickening, the viscosity increasing agent is added to the molten metal and solidification of the metal is avoided by operating at sufficiently high temperatures, usually within the range of from about 20° to about 90°C. above the metals liquidus point. It is to be noted that the increase in viscosity is of shorter duration at higher temperatures. At the same time, if higher operating temperatures are required, more viscosity increasing agent can be employed either initially or, if desired, by incrementally mixing with the melt as it begins to thin.

In general, the operating temperatures used for thickening are over 550°C. but less than 760°C. For many aluminum base metals the temperature range may be from about 650° to about 720°C. At these temperatures the viscosity increase is fairly permanent. In many instances, the increase will last about a half hour or more. This is sufficient time for further processing, such as preparing a foam. The viscosity increase will remain even after short excursions to somewhat higher temperatures. If it is desired to hold the viscosity for longer periods, more viscosity increasing agent can be added when the molten metal starts to thin.

To achieve viscosity increase, the viscosity increasing agent must be admixed within the molten metal; it is not enough to merely treat the surface of the melt with the agent. This can be done by any mixing technique known in the art such as efficient stirring.

Since loss of some of the viscosity increasing agent when mixing is unavoidable due to the disparity between the temperature of the molten metal and the viscosity-increasing agent this must be allowed for in determining the amount used. At a stirring rate of 100 to about 3,000 rpm, generally from about 0.02 or less to about 10 or more grams of thickening agent are employed per each 100 grams of metal. Good results are obtained using 0.25 to about 6 grams of thickening agent per each 100 grams of metal. A preferred general range is from about 0.1 to 5 grams of thickening agent per each 100 grams of metal, and a more preferred range is from about 0.5 to 5 grams of thickening agent per each 100 grams of metal. In any particular instance it might be beneficial to use even greater amounts, up to about 20 grams of thickening agent per each 100 grams of metal.

The specific amount of thickening agent used depends to some extent upon which agent is selected. For example, with carbon dioxide, thickening is obtained using amounts from about 0.05 gram to 8 or more grams per each 100 grams of metal. Better results are generally obtained using from about 0.1 to about 8 grams of $CO_2$ per 100 grams of metal. By way of example, a thickened molten metal can be formed using from 0.1–1 grams of $CO_2$ per 100 grams of metal and, in fact, excellent foams have been produced using as little as 0.3–0.7 grams of $CO_2$ per 100 grams of metal. Likewise, very stable thickened molten metal can be obtained using from 1–8 grams of $CO_2$ per each gram of molten metal.

When water is used a preferred range is from 1–6 grams of $H_2O$ per each 100 grams of metal. With nitrogen the preferred range is from 1–4 grams of $N_2$ per each 100 grams of metal. Likewise, with argon good results are obtained using from 1–4 grams of argon per each 100 grams of metal.

When using oxygen to thicken the molten metal good results can be obtained using from about 0.02 or less to about 5 or more grams per 100 grams of metal. A preferred amount is from about 0.07 to 5 grams per 100 grams of metal, although excellent results have been obtained using as little as from 0.07–0.5 grams per 100 grams of metal. Likewise, good thickening leading to excellent foams results from the use of from about 1–5 grams of oxygen per 100 grams of metal.

With air, a useful thickening range is from about 0.2 or less to about 10 or more grams per gram of metal. A preferred range is from about 0.5–5 grams per 100 grams of metal. A still more preferred range is from 0.5–3 grams of air per each 100 grams of metal. Excellent results have been achieved using from 1–2 grams of air per each 100 grams of metal and, hence, this is a most preferred range.

The viscosity-increasing agent should be rapidly added, preferably in a period of 15 seconds to three minutes. The time may be increased if a proportionately greater amount of agent is used. Generally the foaming will be effected within about one-half hour of treating with the viscosity-increasing agent.

The pressure at which the viscosity-increasing agent is added to the molten metal is not critical. In most instances, there is not much advantage in using pressures less than ambient and ambient pressures are preferred. However, in some instances, increased pressure, say up to 1,500 psig, may be used to advantage. Such pressures can tend to force the foaming agent to mix with the molten metal, the closed vessel and increased pressure retarding escape of the viscosity-increasing agent.

The viscosity-increasing agents of this invention do not act in all respects like a foaming or blowing gas such as hydrogen. They give much less expansion than an equivalent amount of hydrogen. For example, the expansion due to $CO_2$ is in some instances only ⅛ to 1/10 of the expansion due to an equivalent amount of hydrogen. In some instances, the expansion from $CO_2$ is less.

In many instances, the following general rules can be recited as applicable:

1. For a given amount of viscosity-increasing agent, the viscosity increase is proportional to the amount of second metal alloyed with aluminum.

2. The viscosity increase is proportional to the amount of viscosity-increasing agent employed.

3. The higher the temperature, the shorter the duration of viscosity increase.

4. The higher the temperature, the greater the amount of agent required to provide a given viscosity increase.

FOAMING

A wide variety of foaming or blowing agents may be used in the process of this invention and these are generally known in the art. Of the known foaming agents, it is preferred to use metal hydrides. Of these, those which decompose to yield gaseous hydrogen at the temperature of the material to be foamed and release the gaseous hydrogen at not too fast a rate are preferred, especially titanium, hafnium or zirconium hydrides, and more especially the latter. The "dihydrides" of commerce as well as annealed hydrides of less than stoichiometric composition may be used, if desired.

The amount of hydride (or other foaming agent) employed is dependent upon the amount of foaming desired, less foaming agent being required for a dense foam than for a light foam. For many uses, it is preferred to prepare foams having a density of 20 per cent or less; i.e., foams which weigh no more than about 20 per cent of the weight per given volume of the unexpanded metal. For uses such as in die casting, densities of 30 per cent are useful.

For such foams about 0.2 to about 1.0 gram of commercial $HfH_2$, $TiH_2$, $ZrH_2$ per 100 grams of alloy to be foamed may be used. A preferred range is from about 0.5 to about 0.6 gram.

A lower temperature limit must be exceeded in order to prepare foam, namely a temperature above which the metal to be expanded is molten and a temperature above that required to yield the gas required to do the foaming. It is also desirable to use a foaming temperature at which the blowing gas is not formed at an uncontrollable rate. Further, it is desirable to use a temperature at which the melt is sufficiently viscous. With such considerations in mind temperatures within the range of from about 550° to about 780°C. may generally be used and temperatures of from about 670° to about 705°C. are preferred.

It is preferred to carry out the foaming process at ambient pressure although greater or lesser pressures may be used if desired. In many instances, no special benefit is gained from sub-atmospheric pressures and such pressures are deleterious since they can encourage evolution of gas outside the confines of the mass to be foamed. When it is desired to use superatmospheric pressures, pressures up to 1,500 psig or higher may be used.

When carrying out the foaming step of this invention, the foaming agent should be admixed with the mass of melt to be foamed and the more uniform the mixing the better the foam. Any known manner of mixing which provides efficient mixing of materials in liquids can be used, but it is preferred to use efficient stirring, so that the foaming agent metal mixture is substantially homogeneous in as short a time as possible. In most instances, good results are obtained when the foaming agent-metal mixture is substantially homogeneous in a minute or less, but it is preferred to use stirring which will achieve substantial homogeneity in about 10 seconds.

To further understand the preparation of a metal foam according to the process of this invention the following preferred exemplary procedure is given:

1. Heat about 4,000 grams of alloy in an induction pot to 700° to 760°C.

2. After melting, stir the melt so that substantially all of it "moves" say, with a high viscosity head at about 100 to 3000 rpm.

3. Add 10 to 60 grams of powdered $CO_2$ per thousand grams of alloy over a period of 1 to 3 minutes. Some flaming and acetylene-like odour may occur.

4. Bring the viscous mixture to the temperature desired for the foaming step, 650° to 800°C.

5. Add enough foaming agent to give the foam the density desired. For example, when using circonium hydride:
   a. about 1.2 g $ZrH_2$ per 100 g of alloy for a 9 to 11 pound per cubic foot (pcf) dense product having 1/8 to 1/4 inch pores
   b. about 0.9 g $ZrH_2$ per 100 g alloy for a 11 to 14 pcf product 1/16 to 1/8 inch pores
   c. about 0.6 g $ZrH_2$ per 100 g alloy for a 15 to 18 pcf product 1/8 to 1/32 inch pores.

The addition can be conducted while stirring, say 100 to 3,000 rpm, and after all of the foaming agent is in, increasing the stirring rate to 6,000 to 10,000 rpm.

6. The actual foaming can be conducted in a mold whose inner surfaces define the shape of the foamed product. The mold may be open or closed as desired. When open the "top" surface of the product will usually be irregular in shape. When the mold is closed all surfaces of the foamed product can be as defined by the mold and usually, there is less blow-hole or large pore occurrence.

When performing a batch foaming process, there is little time to spare between the addition of the foaming agent and the production of gas, especially if the temperature of the mass to be foamed is comparatively high. This means that to disperse the foaming agent uniformly, quick dispersion must take place. This can be accomplished with high speed stirring which can optionally be used with baffling in the mixing vessel. As implied above, it is preferred to have the temperature of the molten metal comparatively cool so that the foaming gas is not expelled from the foaming agent at such a rate as to prohibit good foaming.

A modified metal hydride may be used to cut down the rate of hydrogen evolution. Zirconium hydride, hafnium hydride, and titanium hydride have the formulae $ZrH_2$, $HfH_2$, and $TiH_2$, respectively. The articles of commerce generally contain somewhat less hydrogen than stoichiometric and may have 1.98 moles of hydrogen per mole of metal. We have found that better results are achieved if the hydrides are heat-treated prior to use. The heat treatment may comprise subjecting the hydride to temperatures of about 100° to about 400°C. for from about 1 to about 24 hours, preferably under an inert atmosphere (a blanket of nitrogen, argon, or a similar inert gas). It is more convenient to use ambient pressure than subatmospheric or superatmospheric pressures. These can be used if desired, however, and in many instances a change in the duration of the heating period and/or the temperature of the process is made. For example, using superatmospheric pressures, say up to about 1,500 psig, it is usually desirable to raise the process temperature and/or the length of heating time. Conversely, when using subatmospheric pressures comparatively lower temperatures and/or shorter heating periods are used. When the composition becomes from 1.65 to 1.80 moles of hydrogen per mole of metal, the product is a fine foaming agent which will yield hydrogen at a reduced rate. There is therefore more time to admix the materials with the molten metal. This lead time therefore lends itself to more uniform mixing. Such mixing and the slower release of hydrogen gives smaller and more uniform pore size.

For the production of very superior foams using the process of this invention, the following five points are given as guidelines.

First of all, it is preferred to thicken at a temperature within a certain range above the liquidus temperature as stated above. The treatment temperature should be fairly constant throughout the mass of metal to be treated. In other words, for best results, there should not be a variation of temperature greater than say 150°C. throughout the mass of the molten metal to be thickened. In view of this, it is preferred to have the molten metal come to more or less an equilibrium before addition of the viscosity-increasing agent.

For best results, attention should be paid to good mixing technique. In other words, the geometry of the mixing vessel is not only determined by capacity requirements, but optimally, it is selected to work well with the mixing equipment used.

In order to conserve viscosity-increasing agent, good mixing is employed. Preferably the mixing technique should be one which "moves" or agitates substantially the entire mass of molten metal being treated, and efficient stirring techniques are suitable in this respect. It is preferred to use stirring equipment which is efficient at high viscosities, say 10,000 to 30,000 centipoises, and a "Cowles Dissolver" or Premier Hi Vis Dispersator with its high viscosity mixing head have been found to be adequate.

The addition of foaming agent is usually carried out at a temperature lower than addition of the viscosity-increasing agent. Thus, in most instances, it is preferred to cool the viscous melt before adding the foaming agent. In many instances, the cooling is best carried out in a second vessel, i.e., a vessel other than the hot chamber in which viscosity was increased.

The walls of the second vessel are preferably preheated to within ±50°C., preferably, ±20°C. of the foaming temperature to be used. Thereafter, the viscous alloy is added thereto and allowed to come to temperature.

The foaming temperature is somewhat dependent upon the viscosity of the molten mass. For those masses which are highly viscous, it is preferred to use comparatively high temperatures. For less viscous materials, lower temperatures are employed. Since the presence of magnesium enhances viscosity, the foaming temperature will depend somewhat on magnesium concentration. When using a 1.2 weight per cent magnesium alloy, temperatures about 650°C. are optimum. For aluminum based alloys having 2.2 and 7 weight per cent magnesium, optimum temperatures for addition of foaming agent are about 635°C. and 615°C. respectively.

Some aluminum-silicon alloys are characterized by having greater fluidities than pure aluminum. For these alloys temperatures of about 530° to 570°C. may be used when adding the foaming agent. Of course, as with other alloys, Al-Mg, for example, higher temperatures can be used if fluidity is compensated for by addition of more viscosity-increasing agent, such as $Co_2$.

When dispersing the foaming agent into the mass to be foamed, it is best to strive for quick mixing, which will afford more homogeneous foams. Hence, high speed mixing techniques which quickly disperse the blowing agent throughout the molten mass are preferred. These techniques are discussed above with regard to addition of the viscosity-increasing agent.

After the addition of the foaming agent, the mass is allowed to foam. This can be done in a variety of ways, for example, in an open or closed mold. If foaming occurs in an open mold, the exposed surface of the foamed mass may become irregular in shape. When effected in a closed mold, the resultant foam can achieve the shape defined by the mold.

Of course, for most purposes, the size of the foaming chamber should be sufficient to contain the expanding mass. The temperature of the sides of the vessel (in which foaming takes place) should not be too cold. If they are, an undesirably thick unblown skin will be formed. If the sides of the vessel are too hot, buckling of the slab, or undesirably large holes will appear in the foamed interior. If too cold, incomplete foaming may occur. In short, by proper regulation of the mold temperatures the smoothness and thickness of the surface of the finished article can be regulated.

If substantial conformance of the foamed product to the size and shape of the reaction vessel is critical, then means should be taken to uniformly distribute the foaming mass into the mold. Thus, for example, in those instances where the admixing of foaming agent and metal did not take place in the mold in which foaming occurs, means should be taken to add the mass in a way to best fill the mold. For example, the mold can be agitated to get the mass into the mold corners.

The mold should not be chilled too suddenly, otherwise the foam will not be uniform and incomplete filling of mold may occur.

The foams produced by the process of the invention are useful as structural materials, for example, curtain walls.

When using substantially pure aluminum, air, carbon dioxide, or oxygen are the preferred thickening agents. Preferably for thickening one uses an aluminum base alloy. Alloys of choice contain one or more of the alloying elements mentioned hereinabove. The most preferred alloying element is magnesium. However, when preparing metal foams from the thickened mass, another preferred alloying element is titanium. When using metal alloys of the types hereinbefore described, one can use oxygen, nitrogen, air, argon, carbon dioxide, or water as the thickening agent. Tin promotes the thickening characteristics of copper-, magnesium-, and zinc-containing alloys. When using air or oxygen, usually an increase in temperature occurs upon introduction of the thickening substance into the metal mass. When using argon it is preferred that thickening be carried out at a temperature of from about 740°C. to about 780°C.

FURTHER ASPECTS OF FOAMING

In general, aluminum magnesium alloys are preferred when preparing foams according to this invention. The resultant foams have a good balance of properties which make them very attractive materials for the uses mentioned thereof. When using such alloys, foams characterized by having small pores of surprisingly uniform size can be prepared. Moreover, such high quality foams can be readily prepared with a density of 10 to 16 pcf. In general, aluminum-magnesium foams are of a slightly higher density than foams prepared from substantially pure aluminum by the same method; and moreover, the Al-Mg foam walls are heavier. With regard to the thickness of cell walls, the presence of silicon, or titanium, tend to make them thin; while copper and zinc (as magnesium) tend to make them heavier. Furthermore, copper and zinc tend to increase the density of the foams. However, copper does not increase the density as much as magnesium on an equal weight of metal basis. Using aluminum-silicon alloys and aluminum-titanium alloys, foams having a density of 8-10 pcf can be prepared. Thus, silicon is an advantageous alloying element even though aluminum-silicon melts are 'thinner' than aluminum and this makes thickening and foaming somewhat more difficult.

Zirconium hydride is a preferred blowing agent for this invention, and it can be used very effectively with a wide variety of aluminum base metals. However, with some alloys containing silicon, titanium hydride gives more satisfactory results.

When foaming substantially pure aluminum, air, carbon dioxide, or oxygen generally give better results than water, argon or nitrogen. With substantially pure aluminum, a given amount of air or oxygen usually affords less thickening than that obtained with certain aluminum alloys, and in such instances, one may wish to use an increased amount of air or oxygen. At least with some samples of aluminum it has been noted that carbon dioxide is an exception to the general rule stated above; viz., that thickening is proportional to the amount of viscosity-increasing agent employed. More specifically, it has been found in these samples that the thickening due to carbon dioxide appears to pass through a maximum at around 2-4 grams of carbon dioxide per 100 grams of metal. When greater amounts are introduced, the thickening is first lessened somewhat but the thickness of the melt does not become reduced to the viscosity of the untreated aluminum. The viscosity can rise upon further $CO_2$ addition; i.e., to levels greater than those causing diminishment. It has been noted that various metals promote the thickening characteristics of aluminum when alloyed therewith. Such metals are exemplified by magnesium, copper, and tin, and also zinc. Since alloys containing these metals thicken to a greater extent than substantially pure aluminum, it is clear the alloying elements promote the thickening process. The abilities of these promoter metals to promote thickening is also indicated by the ability to readily thicken alloys containing them with, for example, argon, water, or nitrogen. The discovery of the promoter aspects of these metals is an important feature of this invention. The mechanism of promotion is unknown.

As mentioned above, treatment with the viscosity-increasing agents of this invention can result in a molten mass so thick that it is resistant to foaming, and the viscosity increase tends to lessen over time. These properties can be taken advantage of when preparing a metal foam. Thus, is is not necessary to thicken to the extent desired to prepare foam and then conduct the foaming operation before the viscosity increase has lessened to an undesirable extent. Rather, one has the option of thickening to an extent greater than that desired, allowing the thickening to decrease to the optimum amount by allowing the molten mass to stand, and then conducting the foaming operation. In many instances, the last procedure is desirable inasmuch as it affords a means to control the amount of viscosity increase and to a great extent also increases the possible time interval between thickening and foaming. One can also thin a mass by adding silicon or titanium thereto.

As inferred above, the molten mass can be made too thick for optimum foaming. In other words, in many instances, the quality of the resultant foam is not directly proportional to the amount of thickening agent added over the entire possible concentration range of thickening agent. One reason for this is the inefficient stirring which will result if the molten mass is too thick. In other words, best results are achieved if the foaming agent is quickly and uniformly dispersed throughout the mass to be foamed. This type of dispersion is difficult to achieve if the mass to be foamed is so thick tha efficient stirring cannot be carried out. Moreover, mass transfer or ability to fill a mold may be undesirably diminished.

EXAMPLE I

A sample of a magnesium-aluminum alloy having 7 weight per cent of magnesium and 0.2 weight per cent of Mn weighing 3173 g, was melted. Nitrogen gas, at a flow rate of 8 litres per minute was bubbled through the molten alloy for 5 minutes. The nitrogen was admitted into the molten alloy through a ceramic tube about two inches below the surface. The alloy was stirred at about 2500 rpm during the nitrogen introduction. Stirring was commenced when the alloy was at 670°C., and at the end of nitrogen introduction the temperature was 550°C.

The alloy was heated to 725°C. and transferred to a holding furnace. The increase in viscosity noted at the end of the five minute introduction period was still apparent upon reaching 725°C. The alloy (prior to nitrogen introduction) had a true viscosity of about 13.8 cp and, upon reaching 725°C., the viscosity was about 29 cp. However, the alloy was very resistant to flow.

The above procedure was repeated using a second batch of the alloy weighing 3,185 g. The nitrogen flow rate was 7 litres per minute and the nitrogen introduction time was 5.4 minutes.

The two batches were combined in a pot heated to 670°C. The metal mass was allowed to cool to 680°C. The mass was stirred at 6000 to 10,000 rpm and 40 grams of zirconium hydride, $ZrH_2$, was admixed over an introduction period of 8.6 seconds. Thereafter it was cast into a mold. The mold capacity was about 8 to 9 times as big as the volume of the unblown liquid combined batches.

The mixture foamed to fill the (closed) mold. The resultant foam was sectioned demonstrating a fine pore, quite uniform structure having a density of about 25 pounds per cubic foot (a density of about 15 per cent of unfoamed alloy).

Similar results are also obtained when the following variations are made:

The amount of nitrogen used in from 40 to 60 liters per 3,000 grams of alloy.

The nitrogen is introduced over a period of from 2 to 5 minutes.

The nitrogen is introduced into the alloy at temperatures of from 650° to 710°C.

The alloy has from 1.2 to 35 weight per cent of magnesium, silicon, manganese, copper, titanium or tin.

From 0.2 to 1.0 gram of $TiH_2$, $ZrH_2$ or $HfH_2$ are used per each 100 gram portion of alloy.

When the nitrogen gas was introduced into the molten alloy, a white smoke was noted above the alloy. In addition, the stirrer shaft exposed to this atmosphere became coated with a fine white powder analyzing as magnesium oxide. This formation of magnesium oxide is not noted when carbon dioxide or air is used as the viscosity-increasing agent. Evidently the nitrogen sweep puts some magnesium into the atmosphere which reacts with the oxygen there to form the white smoke.

EXAMPLE II

This example was conducted on three batches of an aluminum-magnesium alloy having 7 weight per cent of magnesium and 0.2 weight per cent of Batch (a) of said alloy, 3,130 g., was heated to 715°C. Using a hollow stirrer shaft and good mixing, argon was introduced into the molten alloy. The rate of argon introduction was 16 liters/minute; the total time of argon flow was 3 minutes. The argon introduction cooled the alloy to 604°C. The alloy was very resistant to flow. This gross lowering of fluidity was also apparent after heating the alloy to 704°C.

Batch (b) of said alloy, 1,430 g., was melted and heated to 704°C. Through the hollow stirring shaft, 16 liters/minute of argon were introduced for two minutes. Such introduction of argon cooled the alloy to 649 27C. The high viscosity noted was still present upon reheating the alloy to 738°C.

Batch (c) of said alloy, 1,730 g., was heated to 715°C. and while stirring effectively, 16 liters of argon/minute were introduced through the hollow stirring shaft for 2 minutes. This cooled the melt to 682°C., at which temperature the melt was very viscous.

All three batches of viscous alloy were combined in a pot held at 730°C. The metal was allowed to reach 685°C. At that temperature, 40 grams of $ZrH_2$ were added and rapidly dispersed for 6.7 seconds.

The thickened mass was transferred by gravity to a 15 × 15 × 4 ½ inch mold. (The mold temperature was about 300°C.) The thickened mass was too thick to flow well by gravity into the mold; thus, only about 85 per cent of the mass reached the mold.

The mold was closed with a lid. It was held for five minutes at 300°C., then removed from the mold chamber. The foamed casting was removed from the mold.

Sectioning revealed the casting was a substantially uniform, fine pore foam having a density of 18 to 20 pounds per cubic foot.

Similar results are obtained when the following variations are made:

From 1 to 4 grams of argon is used per each 100 grams of alloy.

From 0.6 to 1.2 gram of $ZrH_2$ is used per 100 grams of alloy.

The argon is introduced over a 1 to 4 minute period.

The temperature of the alloy is from 660° to 710°C.

EXAMPLE III

A 2,265 gram sample of the alloy used in Example II was heated to 1,300°F. While excluding air, and while stirring, 11 liters of nitrogen/minute were introduced into the molten mass for five minutes. (The nitrogen was admitted through a hollow stirring shaft while using a stirring rate of 2,000 to 3,000 rpm.) The melt was still very viscous upon reheating to 1,380°F.

EXAMPLE IV

A sample of 2,120 g. of the alloy used in Example III was heated to 1,300°F. While stirring with a stirrer having a hollow stirring shaft at a rate of 2,000 to 3,000 rpm argon gas was introduced into the molten mass through the shaft at a rate of 16 l/minute. The argon introduction was carried out at this rate for 5 minutes.

The gas flow reduced the temperature of the mass to 1,300°F. and markedly increased the viscosity of the molten metal. High viscosity increase was still apparent when the molten alloy was reheated to 1,400°F.

EXAMPLE V

A 3,235 g. sample of an aluminum alloy having 7 weight per cent of Mg and 0.2 weight per cent of Mn was heated to 1,300°F. and 28 grams of $CO_2$ gas were admitted to the molten melt over 2.5 minutes. The $CO_2$ addition was carried out while stirring vigrously and the $CO_2$ was introduced through a copper dip tube. The lower two inches of dip tube eroded during the addition. The temperature of the molten alloy was reduced to 1,180°F. during the gas addition, and its viscosity markedly increased.

Another sample of the alloy, 3,225 grams, was heated to 1,300°F. and treated with gaseous $CO_2$. This time, about 3 inches of dip tube dissolved in the melt. The $CO_2$ added was 85 grams and the addition time was 2.7 minutes. Viscosity was markedly high and the temperature of the melt dropped to 1,100°F. during the $CO_2$ addition.

The two batches of viscous melt were combined in a mixing pot which was at a temperature of 670°C. When the metal mass reached a temperature of 685°C., 40 grams of $ZrH_2$ were added while efficiently stirring at 6,000 to 10,000 rpm.

(During the addition of the $ZrH_2$, a mechanical mishap occurred whereby the stirring shaft fell into the mix pot.) Nevertheless, the hydride-dispersed metal alloy as then fed by gravity to a 15 × 15 × 4 ½inches mold which was at 575°F. Because of the high viscosity, the gravity feed to the mold was poor and a large part of the melt was 'held up'. Thus, only about 85 per cent of the mold was filled.

A very fine-pored uniform foamed casting having a density of 25 pcf was obtained after cooling and opening the mold.

The above example is repeated in one batch of 6,460 grams of aluminum alloy and only 3.23 grams of $CO_2$. A good foam is obtained. The example is repeated again in a single batch, this time using 258 grams of $CO_2$, yielding a good foamed product.

Example V is again repeated in a single batch of 6,460 grams of aluminum alloy, this time using 323 grams of oxygen as the thickening agent. A good foamed aluminum is obtained. It is repeated again, this time using only 1.29 grams of oxygen as the thickening agent.

Example V is repeated in a single batch of 6,460 grams of aluminum alloy using 646 grams of air as the thickening agent. A useful foamed aluminum is obtained. Likewise, when only 12.9 grams of air is used as the thickening agent a good foam is obtained.

Similar results are also obtained when the alloy to be formed contains 2–10 per cent magnesium, 0.8 – 1.2 per cent titanium, 8 – 12 per cent copper, 8 – 12 per cent zinc, 0.4 – 0.8 per cent manganese, 1 – 2 per cent tin, or 0.4 – 2 per cent silicon. Similar results are also obtained when such alloys are thickened with from 1 to 8 grams of $CO_2$, 1 to 6 grams of water, 0.5 to 3 grams of air, 1 to 4 grams of nitrogen, 1 to 4 grams of argon or 1 to 5 grams of oxygen per each 100 gram portion of metal and the thickening is conducted at a temperature 20° to 90°C. above the alloy's liquidus temperature. Comparable results are obtained when $TiH_2$ or $HfH_2$ are used as the foaming agent or when the foaming agent is a non-stoichimetric hydride $TiH_{1.65}$, $HfH_{1.65}$, $HfH_{1.80}$, $TiH_{1.80}$ $ZrH_{1.65}$ or $ZrH_{1.80}$, the blowing agent is used in amounts of from 0.2 to 1.0 gram per each 100 gram portion of metal, and the foaming is conducted from 650° to about 705°C.

EXAMPLE VI

A 3,355 g sample of an aluminum magnesium alloy containing 7 weight per cent of Mg and 0.2 weight per cent of Mn was heated to 1,320°F. while efficiently stirring, air was introduced into the alloy for 3.5 minutes at a rate of 16 l/minute. This markedly increased the viscosity of the molten metal while decreasing the temperature to 1,160°F. Marked viscosity increase was observable when the molten alloy was heated to 1,340°F.

Another 1260 g batch of the same alloy was heated to 1,260°F. While stirring efficiently, air was added to the alloy for 5 minutes at a rate of 15.5 liters per minute. This decreased the temperature to 1,060°F. and markedly increased the viscosity.

Using a mixing pot at 695°C., the combined batches of viscous alloy were brought to 679°C. and foamed with 30 grams of $ZrH_2$. The hydride was admixed for 5.1 seconds with efficient stirring.

The hydride-treated melt was put into a mould as in the previous examples. A fine-pored, fairly uniform foamed casting was obtained.

Similar results are obtained when the following variations are made:

The amount of air is from 0.5 to 3 grams per 100 grams of alloy.

The alloy contains from 1.2 to 35 weight per cent of magnesium, silicon, or tin.

The air is admixed at a temperature of from 20° to 90°C above the liquidus temperature of the alloy.

The amount of zirconium hydride is from 0.6 to 1.2 grams per 100 grams of alloy and the hydride is added at 670° to 705°C.

EXAMPLE VII

A 1,500 gram sample of an aluminum alloy having 7.5 weight per cent of magnesium and 0.2 weight per cent of manganese was heated to 690°C. While efficiently stirring, 90 ml of $H_2O$ was added to the molten metal over a five-minute period. The water was added while the temperature of the metal was 1,250° to 1,300°F.

The water increased the viscosity of the melt. The melt was transferred to a pot at 610°C. and just before foaming the pot temperature was 690°C. Ten grams of zirconium hydride were quickly added with efficient stirring at 4,500 to 6,500 rpm.

The hydride treated melt was allowed to foam in the mixing pot to yield a fine pore foam.

Similar results are obtained when from 1 to 6 grams of $H_2O$ and 0.6 to 1.2 grams of zirconium hydride is used per 100 grams of alloy containing 1.2 to 35 weight per cent of silicon, tin, or magnesium, when the $H_2O$ is added at a temperature of 20° to 90°C. above the liquidus temperature of the alloy and the $ZrH_2$ is added at 670°C. to 705°C.

EXAMPLE VIII

Using a 1627 gram portion of an alloy containing 7 weight per cent of magnesium and 0.2 weight per cent of manganese, the following experiment was conducted:

The alloy sample was heated to 740°C. and made viscous with $CO_2$ (solid). The 'thick' material was transferred to a mixing pot at 690°C. and while vigorously stirring, 20 grams of $HfH_2$ were added. Some minor detonations occurred. The sample was allowed to foam in the mixing pot.

There is another utility conferred by the $CO_2$ treatment. Specifically, such treatment increases the luster of the alloy. In other words, alloys which have been treated with $CO_2$ are brighter to the eye then at the same alloy not so treated. The increased brightness is apparent in alloy masses which have been cooled to the solid state. The brightness persists after other processing, such as foaming the molten alloy.

To illustrate this, two aluminum-magnesium alloy foams were prepared. Foam B was made from alloy treated with $CO_2$ while Foam A was prepared from molten alloy not so treated. The reflectivity of each foam was determined spectrophotometrically. In the test, the reflectance was relative to magnesium carbonate. The results reported below in Columns A and B are per cent diffuse reflectance relative to magnesium carbonate ($MgCO_3$ = 100 per cent diffuse reflectance) at the wavelengths shown.

| Wavelength $M\mu$ | Foam A | Foam B |
|---|---|---|
| 350 | 47.7 | 57.3 |
| 400 | 47.9 | 57.1 |
| 450 | 49.0 | 58.0 |
| 500 | 47.4 | 54.9 |
| 550 | 46.0 | 52.8 |
| 600 | 45.8 | 52.1 |
| 650 | 45.0 | 51.2 |
| 700 | 44.7 | 51.0 |

As shown by the data, Foam B (which was made up of $CO_2$-treated alloy) reflected more light throughout a wide spectral range.

The diffuse reflectance data was obtained using a Beckman Model B spectrophotometer with Beckman's diffuse reflectance accessory.

The formation of increased luster is not dependent on foaming. Thus, luster increase is present when the alloy is molten or solid. Solid objects with increased luster are prepared by merely allowing the molten $CO_2$-treated alloy to cool. The alloy may be cast into desired shape to form a desired object having utility where greater luster is desired.

EXAMPLE IX

Five hundred grams of an aluminum alloy having the following alloying metals

| | |
|---|---|
| magnesium | 7.04 weight per cent |
| manganese | .01 weight per cent |
| silicon | .08 weight per cent |
| copper | .02 weight per cent |
| titanium | .14 weight per cent | was heated to 650°–720°C. in an induction furnace. The molten alloy was stirred at from 100–600 rpm/ The stirring was somewhat inefficient inasmuch as the whole mass of molten alloy was not being thoroughly agitated. While stirring, about 200 grams of solid carbon dioxide was added.

A marked increase in viscosity as noted at these temperatures —650° – 720°C.

After solidification and cutting, there was no pore structure typical of a metal foam.

Similarly, viscosity increases were noted when the experiment was repeated using the following aluminum alloys.

1. 5.5–7 per cent Sn
   0.7 – 1.3 per cent Cu
   0.7 – 1.3 per cent Ni
      maximum impurities 0.7 per cent Si, 0.7 per cent Fe, 0.1 per cent Mn, 0.2 per cent Ti; total others 0.3 per cent
2. 6.5 – 7.5 per cent Si
   0.5 per cent Fe
   0.2 per cent Cu
   0.1 per cent Mn
   0.2 – 0.4 per cent Mg
   0.2 per cent Zn
   0.2 per cent Ti
   0.15 per cent others Viscosity increases were also noted using solid $CO_2$ and the following alloys having the indicated amounts of metals alloyed with aluminum. The stirring conditions were similar to those used above.

A. 4.5 per cent Cu, 1.5 per cent Mg, 0.6 per cent Mn

B. 4.0 per cent Mg, 0.5 per cent Mn

C. 5.5 per cent Zn, 2.5 per cent Mg, 1.5 per cent Cu, 0.3 per cent Cr.

The conditions employed were as follows:

| | Mixing Temp | Time | Amount $CO_2$ | Amount Metal |
|---|---|---|---|---|
| (A) | 660° | 8½ min | 320 g | 1671 g |
| (B) | 660° | 8½ min | 480 | 1666 |
| (C) | 660° | 8 min | 320 g | 1686 |

The above viscosity increases were obtained utilizing comparatively large amounts of $CO_2$. Much less $CO_2$ can be used if more efficient stirring is utilized. The following examples illustrate this.

EXAMPLE X

Samples of aluminum-magnesium alloys having 1, 2, 3, 4, and 7 weight per cent magnesium were prepared by alloying the requisite amount of magnesium to a virgin aluminum having the following composition:

| | |
|---|---|
| aluminum | 99.78 per cent |
| silicon | .056 per cent |
| iron | .14 per cent |
| gallium | .015 per cent |

Portions of the alloys weighing 6,300 grams were heated in a claygraphite lined induction furnace to 670°–690°C. The molten alloys were stirred using efficient stirring. A stirring rate of 2,500–3,000 rpm was employed. The stirring device was an efficient impeller which 'moved' essentially the entire metal mass to be thickened. The amount of $CO_2$ required to thicken the alloys were measured. The extent of viscosity increased used as a criterion was until the mixture was so thick that more $CO_2$ could not be added. The results obtained are noted in the following table.

| Per cent Magnesium | $CO_2$ Addition Time | Amount $CO_2$ Required |
|---|---|---|
| 1 | 1.7 minutes | 357 g* |
| 2 | 0.9 do. | 224 g |
| 3 | 1.15 do. | 155 g |
| 4 | 1.2 do. | 132 g |
| 7 | 1.1 do. | 127 g |

*did not thicken

A sample of virgin aluminum of the above composition and with no magnesium added was thickened with carbon dioxide in the procedure discussed below. For this reason, it is clear that carbon dioxide can thicken substantially pure aluminum as well as aluminum having magnesium in a concentration of less than 2 per cent. Thus, it appears that more $CO_2$ would have foamed the sample with 1 per cent magnesium within the above table.

The aluminum sample, 6,345 g, was heated to 760°C. Then 1,143 g of $CO_2$ snow was added in 3 approximately equal proportions. Each portion decreased the temperature about 100°C. and the temperature was raised by reheating to 760°C. before the second and third portion was added. Each portion was added while stirring at about 2,500 rpm. The three $CO_2$ addition times totaled 5 minutes.

After the last addition the sample of aluminum was reheated to 785°C.; no loss of thickening was observed. (The amount of thickening was about the same as that in Example 12 below). Thereafter, it was transferred to a mix pot which had been previously heated to 690°C. The melt was allowed to cool (from 745°C.) to 690°C. over a 4-minute period.

While stirring at 9,000 rpm, 38 grams of zirconium hydride was added to the thickened melt. The zirconium hydride was added in 6 aluminum foiled wrapped packets of approximately equal amounts, stirring was continued for 4.0 seconds; thereafter, the resultant mass was added to a mold having dimensions 15 × 15 × 4 ½ inches. A lid was put on the mold and was allowed to cool to ambient temperature. A fine pore aluminum foam casting was produced. This preparation shows that comparatively high amounts of the thickening agents of this invention can be utilized to thicken materials somewhat resistant to viscosity increase. In such instances, up to 16, 18, 20 or more grams of thickening agent such as carbon dioxide, and the other agents previously mentioned can be utilized Similarly, alloys of aluminum having up to 35 per cent magnesium and aluminum-tin alloys having 1.2 – 35 per cent tin, as well as aluminum-silicon alloys having 1.2 – 35 per cent silicon, can be thickened using $CO_2$, addition times of 1—3 minutes and 0.05 – 8 grams $CO_2$ per 100 grams alloy. The temperature of the molten alloy is 20°–90°C. above the liquidus point when the $CO_2$ is added.

EXAMPLE XI

A 3,235 g. portion of an aluminum alloy having the composition 7 weight per cent magnesium, 0.2 weight per cent manganese (balance aluminum and impurities) was heated in an induction furnace to 705°C. It was stirred using a settling of 55 volts on the aforementioned stirrer. Gaseous $CO_2$, 28.3 grams, was introduced 4–5 inches beneath the surface of the molten mass over a 2½ minutes period using 174 inch copper tubing. A high increase in viscosity was produced. Similar results are obtained using 0.5 to 1.5 grams of $CO_2$ per 100 g. of alloy.

This and the other examples dealing with use of $CO_2$ demonstrated that the physical state of the $CO_2$ employed is not critical. Using the procedure of the above example, liquid $CO_2$ can be added when employing pressure and temperature conditions under which $CO_2$ is a liquid. (The melting point of $CO_2$ is −56.6°C. at 5.2 stm.)

In some instances it appears that gaseous $CO_2$ is more efficient than solid $CO_2$. In other words, in these instances, it appears that less gaseous $CO_2$ is required (to yield a given viscosity increase) than solid $CO_2$. One such instance is when the alloy employed in Example III above is used.

EXAMPLE XII

A 6,365 gram portion of virgin aluminum was heated to 740°C. The aluminum had the following analysis.

| | | |
|---|---|---|
| aluminum | 99.78 | wt. % |
| silicon | 0.56 | wt. % |
| iron | 0.14 | wt. % |
| gallium | 0.015 | wt. % |

While stirring at 2,000 rpm, oxygen gas was bubbled into the molten aluminum over a period of 4 minutes and 36 seconds such that a total of 4.1 cubic feet of gas was introduced. At the end of the oxygen addition, the temperature of the molten mass had decreased to 720°C. and a marked increase in viscosity was observed.

The thickened melt was reheated to 785°C.; no loss of thickening was observed. Thereafter, it was transferred to a mix pot which had been previously heated to 690°C. The melt was allowed to cool (from 745°C.) to 690°C. over a 4-minute period.

While stirring at 9,000 rpm, 38 grams of zirconium hydride was added to the thickened melt. The zirconium hydride was added in 6 aluminum foil-wrapped packets of approximately equal amounts, stirring was continued for 4.0 seconds. Thereafter, the resultant mass was added to a mold having dimensions 15 × 15 × 4 ½ inches. A lid was put on the mold and was allowed to cool to ambient temperature. A fine pore aluminum foam casting was produced.

EXAMPLE XIII

A 6,390 gram portion of virgin aluminum having the same analysis employed in Example XI was heated to 740°C. Thereafter, 7.1 cubic feet of air was added through a hallow-shift stirrer over a period of 4.5 minutes. While the addition was carried out, the mixture was stirred at a rate of 2,500 rpm. After addition was complete, the temperature of the molten (and now thickened) mass had decreased to 710°C. The resultant mass was heated to 770°C. and no loss in viscosity was observed.

The mass was then transferred to a mix pot and allowed to cool to 690°C. Thereafter, 38.5 grams of zirconium hydride was added in six aluminum foil-wrapped packets of approximately equal weight of hydride. Stirring at about 9,000 rpm was continued for 5.4 seconds after the addition of the hydride.

Thereafter, the foaming mass was transferred to a mold 15 × 15 × 4 ½ inches, and the lid was placed on the mold.

A set cellular aluminum foam having small pores had a density of approximately 18 pcf. was produced.

EXAMPLE XIV

A 13,750 gram portion of Almag 35 was heated to 760°C. Thereafter, 376 grams of carbon dioxide snow was added with stirring at 2,500 rpm. The addition of the carbon dioxide caused a decrease in temperature to about 700°C.

The mixture was then reheated to 780°C. and transferred to a mix pot and allowed to cool to 682°C. At that temperature 82 grams of zirconium hydride and 15 aluminum foil-wrapped packets (of approximately equal amounts of hydride) was added. After addition, stirring was conducted at 1,000 rpm for 6 seconds and then for 3.9 seconds at 1,220 rpm. After that period the foaming mass was transferred to a mold 26 × 26 × 3 ⅝ inches which mold was at 355°C. The mold was filled completely, and the lid was placed on the mold.

On cooling to ambient temperature a medium pore size set cellular foam was produced. Samples of this foam having the dimensions 2½ × 12 × ¾ inches in size were obtained by sawing the set cellular product. These samples had a density of 16.4, 17.1, 17.8, 19.0, and 21.8 pcf; and a flexural load strength of 45, 52, 65, 78, and 90 pounds respectively. The load strength was determined by ASTM test D790–66.

We claim:

1. A process for foaming an aluminum based metal, said process comprising (a) substantially admixing, prior to foaming with a metal hydride,
   i. said aluminum based metal at a temperature 20°–90° above the liquidus temperature of the metal, and (ii) a gaseous viscosity increasing agent selected from the class consisting of air, oxygen, carbon dioxide, nitrogen, water, and argon, to achieve a marked viscosity increase so that the thickened molten metal is transformed from a fluid to a viscous melt which can be stirred,
and (b) subsequently, substantially uniformly mixing a metal hydride foaming agent with the viscous melt thereby produced to foam said metal, and (c) subsequently cooling the foam to form a set cellular product, said product having a more uniform pore size and configuration than a product similarly produced from said metal without the addition of the viscosity increasing agent;
said process being further characterized in that said metal hydride is mixed into said viscous melt at a temperature lower than the temperature at which said gaseous viscosity increasing agent is mixed into said metal.

2. Process of claim 1 wherein said metal is substantially pure aluminum.

3. Process of claim 1 wherein said aluminum based metal is alloyed with a second metal selected from the class consisting of magnesium, titanium, copper, zinc, manganese, tin, and silicon.

4. Process of claim 3 wherein said second metal is present in an amount of from about 0.4 to 35 weight per cent.

5. Process of claim 3 wherein said second metal is magnesium.

6. Process of claim 5 wherein said magnesium is present in an amount of from about 2 to about 10 weight per cent.

7. The process of claim 6 wherein said amount of magnesium is from about 4 to about 8 weight per cent.

8. Process of claim 3 wherein said second metal is titanium.

9. Process of claim 8 wherein said titanium is present in an amount of from about 0.5 to about 2.5 per cent by weight.

10. Process of claim 9 wherein said amount of titanium is from about 0.8 to about 1.2 weight per cent.

11. Process of claim 3 wherein said second metal is copper.

12. Process of claim 11 wherein said copper is present in an amount of from about 2.5 to about 35 weight per cent.

13. Process of claim 12 wherein said amount of copper is from about 8 to about 12 weight per cent.

14. Process of claim 3 wherein said second metal is zinc.

15. Process of claim 14 wherein said zinc is present in an amount of from about 3 to about 15 weight per cent.

16. Process of claim 15 wherein said amount of zinc is from about 8 to about 12 weight per cent.

17. Process of claim 3 wherein said second metal is manganese.

18. Process of claim 17 wherein said manganese is present in an amount of from about 0.4 to about 1.5 weight per cent.

19. Process of claim 18 wherein said amount of manganese is from about 0.4 to about 0.8 weight per cent.

20. Process of claim 3 wherein said second metal is tin.

21. A process of claim 20 wherein said amount of tin is from about 1 to about 2 weight per cent.

22. Process of claim 3 wherein said second metal is silicon.

23. Process of claim 22 wherein said silicon is present in an amount of from about 0.4 to about 12 weight per cent.

24. Process of claim 23 wherein said amount of silicon is from about 0.4 to about 2 weight per cent.

25. Process of claim 1 wherein from about 0.02 to about 10.0 grams of viscosity-increasing agent are employed per each 100 grams portion of said alloy.

26. Process of claim 3 being further characterized in that from about 0.2 to about 10 grams (per each 100 gram portion of alloy) of air is used as the viscosity-increasing agent.

27. Process of claim 3 being further characterized in that from about 1 to about 4 grams (per each 100 gram portion of alloy) of nitrogen is used as the viscosity-increasing agent.

28. Process of claim 3 being further characterized in that from about 1 to about 6 grams (per each 100 gram portion of alloy) of water is used as the viscosity-increasing agent.

29. Process of claim 3 being further characterized in that from about 1 to about 4 grams (per each 100 gram portion of alloy) of argon is used as the viscosity-increasing agent.

30. Process of claim 3 wherein from about 0.05 to about 8 grams of carbon dioxide (per each 100 gram portion of alloy) is used as the viscosity-increasing agent.

31. Process of claim 30 wherein said carbon dioxide is added as solid carbon dioxide.

32. Process of claim 30 wherein said carbon dioxide is added as liquid carbon dioxide.

33. Process of claim 3 wherein from about 0.02 to about 5 grams of oxygen is used (per each 100 gram portion of alloy) as the viscosity-increasing agent.

34. Process of claim 1 wherein said metal hydride is selected from a class consisting of titanium hydride, zirconium hydride, and hafnium hydride.

35. Process of claim 34 wherein said hydride is titanium hydride.

36. Process of claim 34 wherein said hydride is zirconium hydride.

37. Process of claim 34 wherein said hydride is hafnium hydride.

38. Process of claim 3 wherein said aluminum based metal is an aluminum silicon alloy and said foaming agent is titanium hydride.

39. Process of claim 3 wherein said aluminum based metal is an aluminum magnesium alloy and said foaming agent is zirconium hydride.

40. Process of claim 1 wherein said foaming agent has the formula $MH_a$ wherein M is selected from the class consisting of titanium and zirconium and "a" has a value within the range of from about 1.65 to 1.80.

41. Process of claim 1 being further characterized in that said blowing step comprises treating the viscous melt with said metal hydride at a temperature of from about 550° to 780°C.

42. A cellular metal foam produced by a process comprising
  a. increasing the viscosity of a molten aluminum base metal by admixing with said metal at a temperature of from about 20° to about 90°C. above said metal's liquidus temperature, a viscosity increasing agent selected from the class consisting of argon, nitrogen, air, oxygen, carbon dioxide and water to achieve a desired degree of viscosity increase,
  b. subsequently foaming the viscous metal thereby produced, and
  c. substantially cooling the foamed mass thereby produced to form a set cellular product, said product having a more uniform pore size and configuration than a product similarly produced from said metal without the addition of the viscosity increasing agent.

* * * * *

UNITED STATES PATENT OFFICE
CERTIFICATE OF CORRECTION

Patent No. 3,816,952    Dated June 18, 1974

Inventor(s) Leonard M. Niebylski et al

It is certified that error appears in the above-identified patent and that said Letters Patent are hereby corrected as shown below:

In the Abstract, line 7, "MH₂" should read -- $MH_a$ --

Column 7, line 7, "circonium" should read -- zirconium --

Column 12, line 32, "27C" should be omitted and replaced with -- °C. --

Column 16, lines 54 and 55, "8 1/8" should read -- 8 1/2 --

Column 18, line 16, "174" should read -- 1/4" --

Signed and sealed this 1st day of October 1974.

(SEAL)
Attest:

McCOY M. GIBSON JR.
Attesting Officer

C. MARSHALL DANN
Commissioner of Patents